No. 871,492. PATENTED NOV. 19, 1907.
J. S. DUNLAP.
COFFEE POT.
APPLICATION FILED MAR. 14, 1907.
2 SHEETS—SHEET 1.
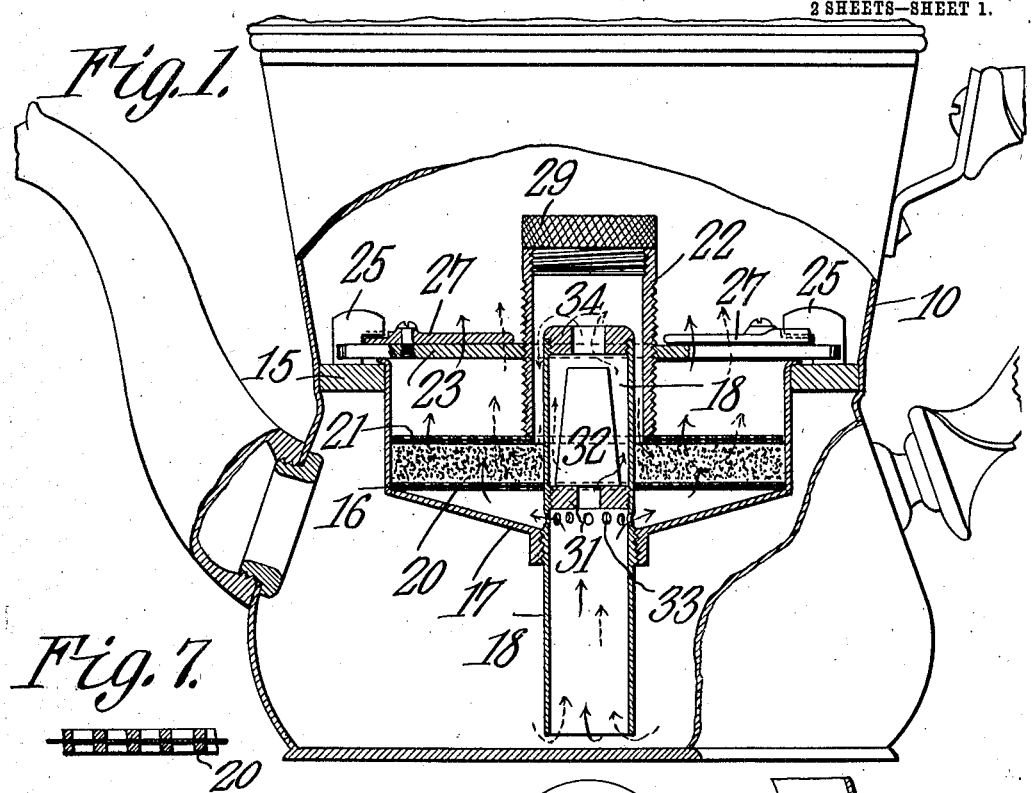
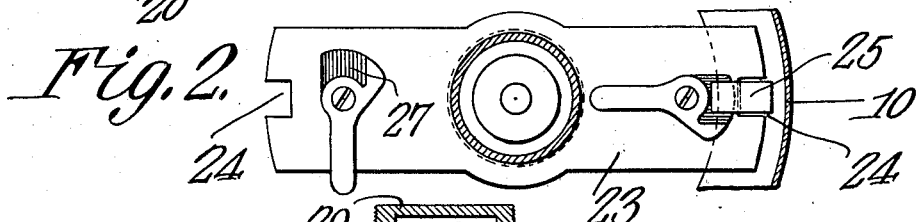
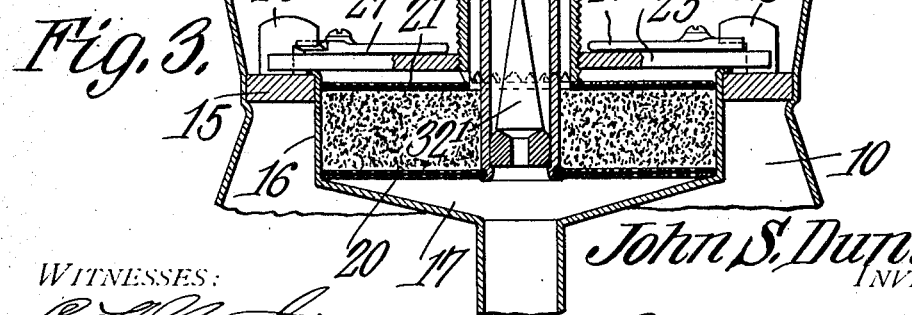
WITNESSES:
John S. Dunlap,
INVENTOR.
By C. A. Snow & Co.
ATTORNEYS No. 871,492. PATENTED NOV. 19, 1907.
J. S. DUNLAP.
COFFEE POT.
APPLICATION FILED MAR. 14, 1907.
2 SHEETS—SHEET 2.
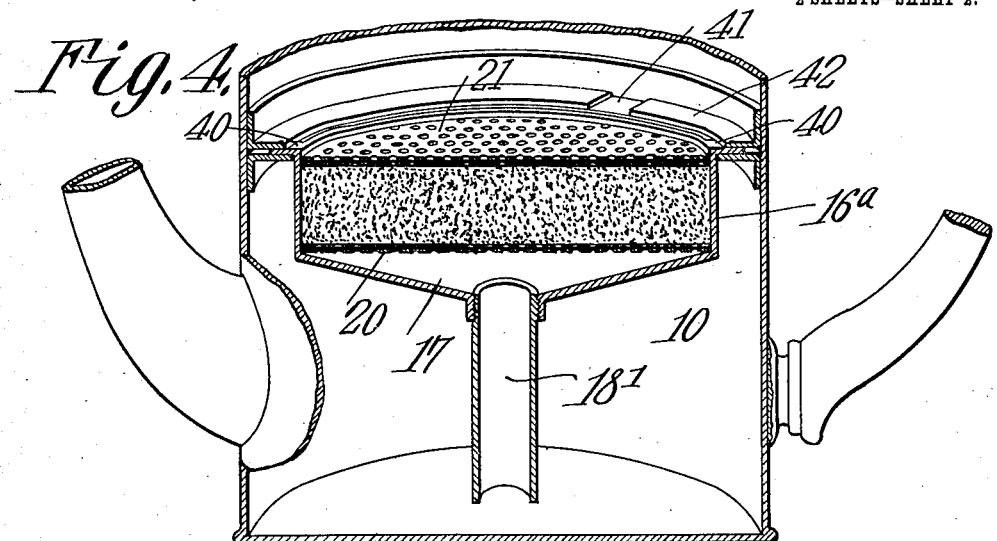
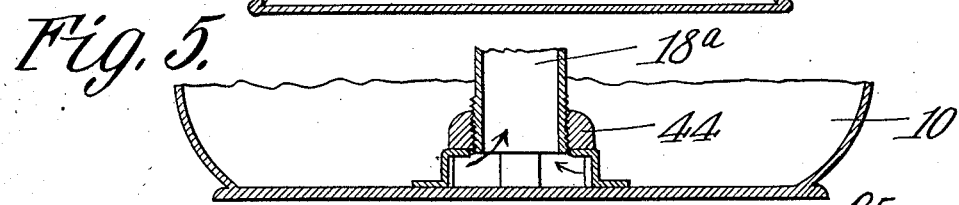
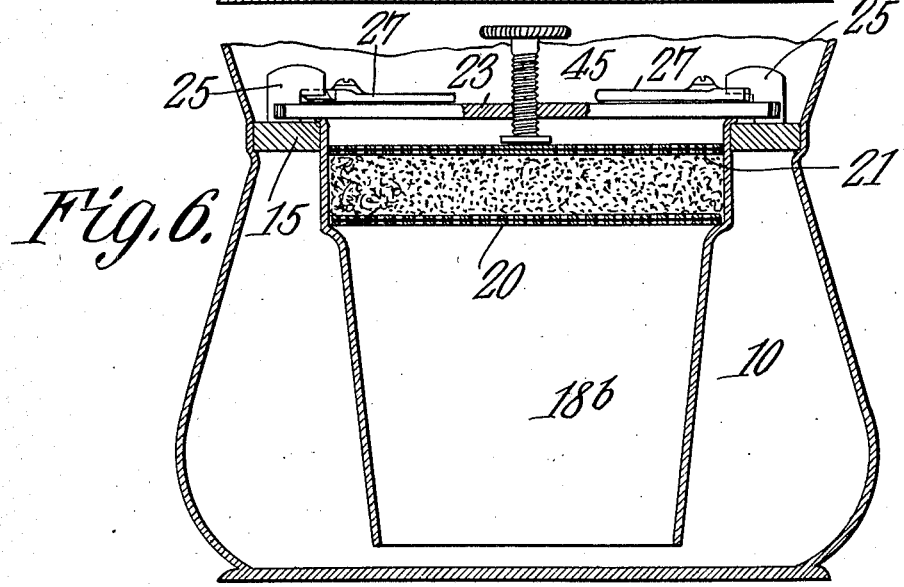
WITNESSES: John S. Dunlap, INVENTOR.
By C. A. Snow & Co.
ATTORNEYS

UNITED STATES PATENT OFFICE.

JOHN S. DUNLAP, OF CHICAGO, ILLINOIS.

COFFEE-POT.

No. 871,492.   Specification of Letters Patent.   Patented Nov. 19, 1907.

Application filed March 14, 1907. Serial No. 362,390.

*To all whom it may concern:*

Be it known that I, JOHN S. DUNLAP, a citizen of the United States, residing at Chicago, in the county of Cook and State of Illinois, have invented a new and useful Coffee-Pot, of which the following is a specification.

This invention relates to coffee pots or urns and has for its principal object to provide a percolating device of simple construction by which a strong infusion of coffee or other material may be made without boiling.

A further object of the invention is to provide a device of this type in which the pot or urn is divided into upper and lower chambers by the coffee container or percolator, and a single pipe or tube is used through which the boiling water is driven upward from the lower compartment through the coffee, and afterwards is again conducted down from the upper compartment to the lower compartment.

A still further object of the invention is to provide a device of this class in which the infusion may be obtained by a double passage of the boiling water through the coffee without, however, inducing the continuous circulation and consequent boiling of the coffee as commonly practiced in devices of this class.

A still further object of the invention is to provide a percolator which may be firmly locked within the coffee pot or urn, and easily removed for cleansing or refilling.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a sectional elevation of a coffee pot or urn constructed in accordance with the invention. Fig. 2 is a plan view of the percolator locking device. Fig. 3 is a sectional view illustrating a slight modification. Fig. 4 is a sectional perspective view of a coffee pot illustrating a further modification in which the valve is omitted. Fig. 5 shows a further modification of the means for locking the percolator within the pot. Fig. 6 is a sectional view illustrating a still further modification of the invention. Fig. 7 is an enlarged detail sectional view of the foraminous disks and filtering paper shown in Fig. 1.

Similar numerals of reference are employed to indicate corresponding parts throughout the several figures of the drawings.

In the majority of coffee percolators now in use the water circulates continuously through the percolating chamber, being driven upward generally to a point above the coffee container, and then passing by gravity through the coffee to the lower chamber where, being again heated, it rises to the upper chamber, the circulation being practically continuous.

In the present case one of the principal object is to avoid this continuous circulation and boiling of the coffee and to obtain an infusion by a double passage of the water through the ground or powdered coffee. In the drawings the pot or urn 10 may be of any desired shape and size, and may, if necessary, be provided with suitable heating appliances, especially where the device is used in hotels or restaurants.

At the center of the pot is an inwardly extending flange 15 which forms a seat for a cylindrical casing 16 having a tapered bottom 17. At the central portion of the bottom 17 is a threaded boss in which is screwed a pipe 18, the lower end of the pipe being adjacent to the bottom of the pot, so that practically all of the water within the pot will be forced up through the tube 18 by the accumulation of steam around the outside of the tube and the casing 16.

The tube extends up some distance above the flange 15, and over said tube is fitted a plurality of pairs of foraminous disks 20 and 21 formed of perforated metal, wire gauze, or the like, and between each pair of metal disks is preferably interposed a disk of filtering paper 20', the coffee being packed between the pairs of disks, as shown. The upper disk is held down in place by a short tube 22, the periphery of which is threaded and screws through an opening formed in a cross bar 23. The opposite ends of the cross bar are provided with notches 24 for the reception of shouldered lugs 25 that are carried by the flange 15, and these lugs are engaged by cam levers 27 that are pivoted on the cross bar 23, and by turning these cam levers, the bar may be locked down and the upper percolator disk confined in place. The top of the tube 22 is closed by a plug 29 which may, if necessary, be formed integral with said tube.

The tube 18 is provided with an inwardly extending annular flange 31 forming a seat for a frusto conical valve 32 which will normally prevent the passage of water through the opening formed by the flange, and all of the water passing upward through the tube will be compelled to pass out through the perforations 33 formed below the valve seat, the water passing into the casing 16 at a point below the lowermost of the percolator disks, and thence passing upward through the coffee in the manner indicated by the arrow in Fig. 1. At the top of the tube 18 is an inwardly extending annular flange 34 forming a somewhat contracted opening to permit the passage of any water which may rise with sufficient force to unseat the valve 32, but unless the temperature is abnormally high no water will pass beyond the valve.

The valve acts as a retarding means for preventing the upward passage of water until its temperature has been raised in the lower chamber to a point most suitable for the purpose of making the infusion. If, however, there is an abnormally high temperature, the water will pass rapidly upward and will unseat the valve, and in such case must pass over the top of the tube 18 and down through the tube 22 to a point within the coffee chamber.

In practice, coffee is placed between the disks 20 and 21, and water is placed in the lower chamber, after which the lower part of the apparatus is heated in any suitable manner. As soon as steam begins to form and accumulate around the tube 18 and casing 16, the water will be forced upward through said tube and after passing through the coffee, will be held in the upper chamber by the pressure of steam in the lower chamber. The temperature in the lower chamber is then reduced either by removing the pot from the stove or by the application of any cooling means, and as the steam in the lower chamber condenses, a partial vacuum is formed which allows the partial infusion in the upper chamber to again pass down through the coffee, and through the tube 18 to the lower chamber.

When the pot is tilted for pouring, the valve 32 will be unseated, and equalization of pressures in the upper and lower chambers may readily take place. Inasmuch as the valve is frusto-conical in form, and nearly the same diameter as the tube 18, it will rock back to seating position as soon as the pot is replaced in the horizontal position.

The upper tube 22 forms a convenient means for the removal of the upper bar 23 as soon as the levers 27 are moved to release position, and this bar and tube may then be lifted out, while the casing 16, tube 18 and percolator as a whole may be readily withdrawn by grasping the upper part of said tube 18.

In the construction shown in Fig. 4, the valve 32' is conical in form, and that portion of the tube between the bottom 17 and the percolator disk 20 is omitted in order to permit greater freedom of flow of the water.

In the construction shown in Fig. 4, the percolator casing 16$^a$ is provided with a pair of outwardly extending lugs 40 which may be passed through notches 41 formed in a flange 42 after which the casing may be turned and thus locked in place. In this instance the valve has been omitted and the operation otherwise remains the same as that previously described, the water being forced upward through the tube 18' and being held in the upper chamber by the pressure of steam in the lower chamber until after the temperature of such lower chamber has been reduced.

As a further modification of the percolator holding means, the tube 18$^a$ may be threaded at its lower end, as shown in Fig. 5 and screwed into a stationary nut 44 secured to the bottom of the pot or urn.

In Fig. 6 is illustrated a construction in which the lower tube 18$^b$ is of much larger diameter than that shown in the remaining figures, and the upper percolator disk is held in place by a small screw 45 passing through the locking bar 23.

In practice it will, of course, be necessary to stop or plug the pouring spout, and any suitable provision may be made for this, the spout being stopped by means of a removable cork or plug, or a suitable valve may be employed for the purpose.

I claim:—

1. In a coffee pot or urn, a detachable percolator having a closed bottom and dividing the interior of the pot into upper and lower chambers, a stationary support projecting inward from the wall of the pot and supporting said percolator, means for locking the percolator to the support, and a tube carried by the closed bottom of the percolator and bodily removable therewith, said tube forming the sole passage for the water and infusion from the lower to the upper chamber, and vice versa.

2. A coffee pot or urn having an inwardly extending flange, a detachable percolator supported by the flange and having a closed bottom which in connection with said flange divides the pot into upper and lower chambers, a tube pendent from the casing of the percolator and forming the sole passage for the liquid in both directions, and means for locking the percolator to said flange.

3. A coffee pot or urn having an inwardly extending flange, a percolator casing supported thereby and having a tapered bottom, an open ended tube extending through said tapered bottom, a valve seat above the tapered bottom, a tapered valve mounted on the seat, a pair of foraminous disks for confining the coffee in the casing, a threaded tube bearing against the upper disk, a locking bar having a threaded opening for the reception of said threaded tube, said bar having notched ends, lugs projecting from the flange and entering the notches, and cam levers pivoted to the locking bar and arranged to fit under said lugs.

4. In a device of the class specified, a percolator arranged to divide the coffee pot into upper and lower chambers, a tube forming a connecting passage between said upper and lower chambers, and a valve arranged within said tube, said valve being arranged to unseat through movement of the pot from horizontal position to permit equalization of pressure in the upper and lower chambers.

5. A coffee pot having an inwardly extending flange, a percolator casing supported thereby and having a tapered bottom, an open ended tube depending from the tapered bottom of the percolator casing, a valve seated above the tapered bottom, a plurality of pairs of foraminous disks for confining the coffee in the casing, a filtering disk interposed between each pair of foraminous disks, and means for locking the percolator casing in engagement with the flange.

6. A coffee pot including a percolator casing having a tube depending from the bottom thereof, a plurality of pairs of foraminous disks disposed within the casing for confining the coffee in said casing, a filtering disk interposed between each pair of foraminous disks, a valve arranged within the casing above the tube, means for locking the casing within the coffee pot, and a housing piercing the locking means for bearing against the upper foraminous disk of the adjacent pair for retaining the coffee within the casing.

7. A coffee pot having an inwardly extending flange, a percolator casing supported thereby and having a tapered bottom, a tube depending from said bottom, a plurality of pairs of foraminous disks arranged within the casing for confining the coffee in said casing, a filtering disk interposed between each pair of foraminous disks, a tube piercing said disk and provided with a valve seat, a valve engaging the valve seat, a locking bar extending transversely across the pot and bearing against the flange, means for locking the bar in engagement with the flange, and a housing for the valve tube having its lower end threaded on the locking bar and provided with terminal teeth adapted to bear against one of the adjacent pair of foraminous disks.

In testimony that I claim the foregoing as my own, I have hereto affixed my signature in the presence of two witnesses.

JOHN S. DUNLAP.

Witnesses:
A. E. OLSON,
E. L. WOOD.